United States Patent
Wada et al.

[15] 3,681,525
[45] Aug. 1, 1972

[54] DIGITAL ROTATION MOTOR

[72] Inventors: Yoshiyo Wada; Hisao Kinjo; Seiichi Takashima; Fumio Akuwa, all of Kanagawa-ken, Japan

[73] Assignee: Victor Company of Japan, Ltd., Kanagawa-ku, Yokohama-City, Kanagawa-ken, Japan

[22] Filed: Feb. 17, 1971

[21] Appl. No.: 116,119

[30] Foreign Application Priority Data

Feb. 20, 1970 Japan..........................45/14214
Feb. 20, 1970 Japan..........................45/14215

[52] U.S. Cl..................178/6.6 DD, 310/49, 310/78
[51] Int. Cl................................................H04n 5/76
[58] Field of Search........310/49, 77, 89, 78, 92, 100, 310/112, 114, 100, 163, 183, 265; 318/623; 179/100.41; 178/6.6 DD

[56] References Cited

UNITED STATES PATENTS 3,286,109  11/1966  Madsen...........................310/49
3,389,277  6/1968  Fiore...............................310/77
3,054,304  9/1962  Jursik..............................310/78
2,823,324  2/1958  Davis..........................310/164 X
3,469,124  9/1969  Willcox............................310/49
3,469,123  9/1969  Inaba...............................310/49

*Primary Examiner*—J. D. Miller
*Assistant Examiner*—R. Skudy
*Attorney*—Louis Bernat

[57] ABSTRACT

A digital rotation or stepping motor contains oil of suitable viscosity which fills the space between a rotor and a stator. The motor is digitally and intermittently stepped in response to input pulses. The viscosity of the oil is selected to prevent a hunting which might otherwise be produced when the rotor stops its intermittent rotation.

5 Claims, 9 Drawing Figures

DIGITAL ROTATION MOTOR

This invention relates to a digital rotation or stepping motor having means for preventing a hunting and, more particularly, to a digital rotation motor which can prevent the hunting which might otherwise be produced when the motor stops its stepping operation.

A digital rotation motor generally represents a motor which is digitally and intermittently rotatable, and it may also be called either a stepping motor or pulse motor. There is a rotary magnetic medium recording and reproducing apparatus which comprises a continuously rotating magnetic disk. Magnetic heads intermittently move radially across the magnetic disk so as to record and reproduce signals on concentric circular tracks. In this magnetic recording and reproducing apparatus, the digital rotation motor is used as means for linearly and intermittently moving the magnetic head.

In the magnetic recording and reproducing apparatus, for example, two magnetic heads alternately and intermittently step forward for every field or frame. The intervals of frequencies allowed for the repeated starting and stopping of each head are therefore extremely short. Thus, high speed and accuracy are required with a fast rising characteristic and a tracking position of the driving system of the magnetic heads. Moreover, it is absolutely necessary to prevent the hunting phenomenon which directly affects the accuracy of positioning of the tracks and the jitter direction during stepping of the magnetic heads.

Therefore, it is a general object of the present invention to provide a novel and useful digital rotation motor which can meet the above mentioned requirements and prevent the generation of the hunting.

Another object of the invention is to provide a digital rotation motor which is capable of efficiently damping the hunting when the intermittent rotation of the motor stops, thereby avoiding the harmful hunting.

A further object of the invention is to provide a digital rotation motor which can prevent the hunting and, particularly in the rotary magnetic medium recording and reproducing apparatus, define the position of the magnetic heads with great accuracy.

A still further object of the invention is to provide a digital rotation motor which has means for preventing the hunting in a motor unit.

A still further object of the invention is to provide a digital rotation motor which is so constructed that the hunting of a rotor can be prevented by the viscous resistance of oil having adequate viscosity.

These and other objects and features of the invention will be apparent from the description hereinafter set forth with reference to the accompanying drawings, in which.

Figure 1:
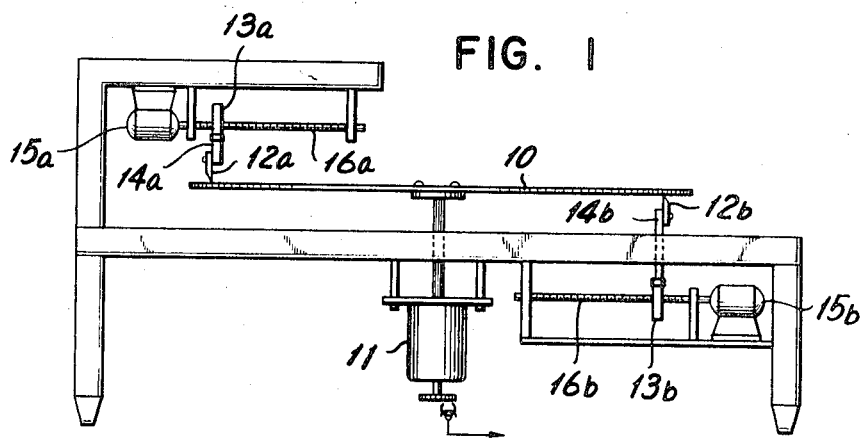
FIG. 1 is a side view of an embodiment of a rotary magnetic recording and reproducing apparatus in which a digital rotation motor according to the invention can be applied.

FIG. 1 shows a rotary magnetic medium recording and reproducing apparatus using a digital rotation motor according to this invention. A rotary magnetic sheet 10 having upper and lower magnetic surfaces is rotated by a driving motor 11 at a rotation speed of 60 or 30 rotations per second in synchronizing with a video signal. Recording and reproducing magnetic heads 12a and 12b are secured by head supports 14a and 14b with half-nuts 13a and 13b and respectively make contact with the upper and lower surfaces of the magnetic sheet 10. Pulse motors 15a and 15b are digital rotation motors and have rotary shafts fixed with feed screws 16a and 16b. The above-mentioned half nuts 13a and 13b are respectively threaded with the feed screws 16a and 16b.

The pulse motors 15a and 15b alternately and intermittently rotate whereby the magnetic heads 12a and 12b alternately and intermittently step forward in a radial direction of the magnetic sheet 10. The magnetic heads 12a and 12b alternately record a video signal in every field or frame on the magnetic sheet 10 during their stopping period. The magnetic heads 12a and 12b are respectively moved in two track pitches by rotations of the pulse motors 15a and 15b responsive to two applied pulses and in one track pitch by rotations of the pulse motors 15a and 15b responsive to one pulse. The magnetic heads 12a and 12b are moved surface of the magnetic sheet 10 from the outer to the inner peripheral tracks or from the inner to the outer peripheral tracks respectively, in two track pitches per move. The heads are moved in one track pitch only when they step to reverse the direction of stepping. As the result, the concentric circular tracks are formed by the magnetic heads 12a and 12b which are alternatively active in the stepping directions.

Figure 2A:
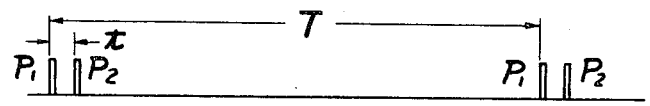
FIGS. 2A and 2B are, respectively, views of the waveform of pulses applied in the motor and a characteristic of the stepping response of a digital rotation motor, which illustrate an operation of the digital rotation motor.

Here, for instance, the pulse motor 15a (or 15b) makes a stepping rotation, in an angle $\eta°$, responsive to one pulse. When the motor receives two pulses $P_1$ and $P_2$ with an interval t, as shown in FIG. 2A, for stepping in an angle $\theta°$, the head 12a (or 12b) is moved in two track pitches.

Figure 2B:
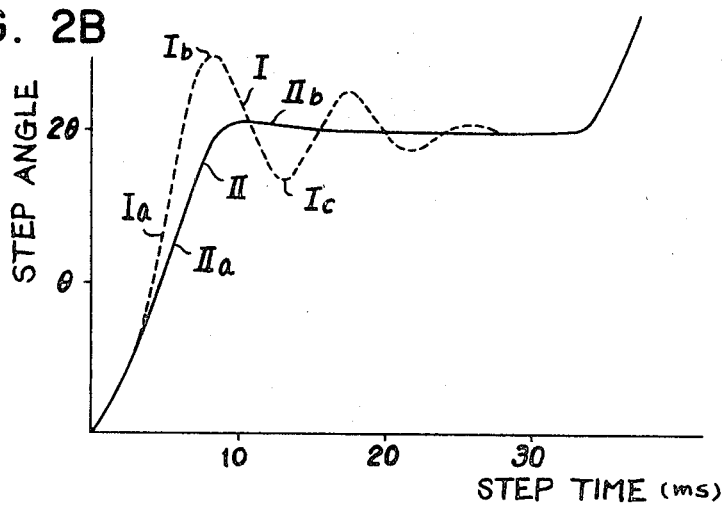

The conventional pulse motor used as the pulse motor 15a will show a rising and stopping characteristic of rotation, as shown by broken line in FIG. 2B. As apparent from FIG. 2B, the conventional pulse motor can not stop immediately and stably after rotational stepping. Often the motor overshoots Ib and undershoots Ic after the rising of the stepping rotation shown by a curve Ia. These overshoots and undershoots are produced in response to a spring constant as defined by the magnetic tractive force between a rotor and a stator in the pulse motor. After the rising Ia of stepping rotation, the hunting phenomenon occurs accompanying the attenuating vibrations of 2–4 cycles.

Here, the magnetic sheet 10 may be rotated at the rotation frequency of 60 rotations per second for normally recording and reproducing the video signal of one field by one magnetic head. Then, the magnetic heads 12a and 12b will alternately and intermittently step forward in the frequency of one-thirtieth second. The one-sixtieth second period in the first half of the one-thirtieth second period covers the stepping period of the head during which the recording or reproducing is not being performed. In the second half period of one-sixtieth second, the recording or reproducing is performed. However, in the conventional pulse motor as described, the hunting may also occur in the beginning part of the second half period of one-sixtieth second of recording or reproducing.

Figure 3:
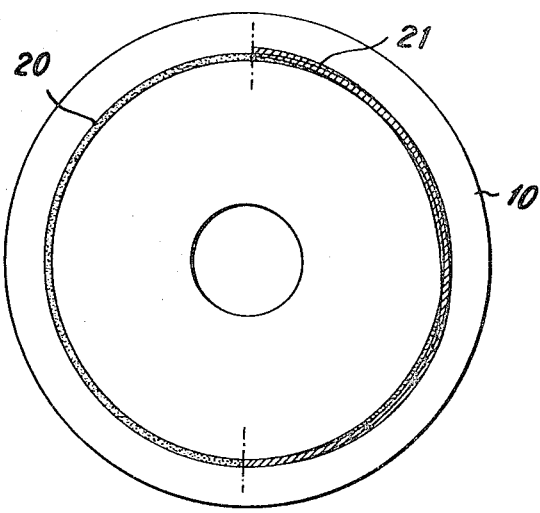
FIG. 3 is a view of a track pattern on a magnetic sheet illustrating a hunting phenomenon.

Shown in FIG. 3 is a track pattern of the magnetic sheet 10 formed by the magnetic head 12a when there is a hunting in the pulse motor 15a. If the pulse motor 15a has not produced hunting, but is entirely stopped, the magnetic head 12a also completely stops, Accordingly, at this instant, a complete circular track 20 is formed by the magnetic head 12a on the rotating magnetic sheet 10. In the event the pulse motor 15a hunts and the position of the magnetic head 12a is shifted, there is formed a track 21 which is not a completely accurate circle on the magnetic sheet 10. Therefore, the track 21 deviates from the circular track 20 and runs in and out in a snaky way. A reproduced image picture of a signal which is reproduced from such track 21 contains beats and jitters, and it is worse in the image quality.

A method has been proposed to solve the problem of this hunting. According to this method, the magnetic heads are increased in the number and the frequency intervals T between groups of the pulses $P_1$ and $P_2$ as shown in FIG. 2A are made much longer. The stopping period of the head is also made longer for the recording and reproducing operation. In this method, however, the magnetic recording and reproducing apparatus become very complicated in its construction. There has also been proposed a method of reducing the hunting phenomenon by applying a friction load to the head mechanism. According to the method as proposed, the head mechanism becomes unstable in operation due to changes of friction, partly by lapse of time, as well as by wear so that it cannot be reduced into a practical use.

The present invention concerns a digital rotation motor which has eliminated the above described disadvantages and which can completely prevent the hunting phenomenon. A first embodiment of the digital rotation motor according to the invention is now shown in FIGS. 4 and 5.

Figure 4:
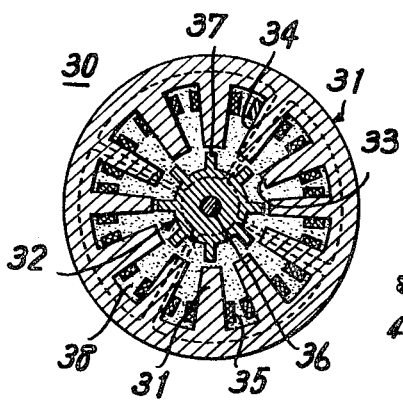
FIGS. 4 and 5 are respectively a vertically sectioned front view and a vertically sectioned side view of one embodiment of a digital rotation motor according to the invention.
Figure 5:
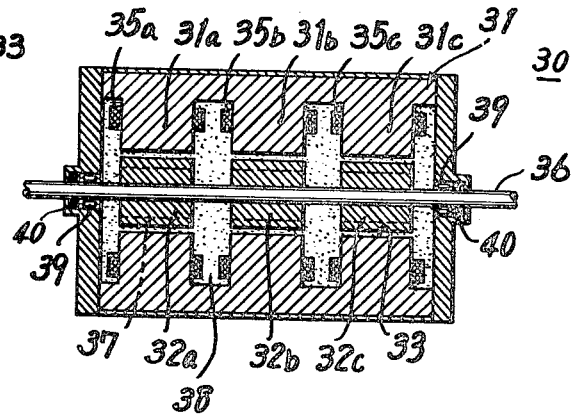

FIGS. 4 and 5 respectively show a vertically sectioned front view and a vertically sectioned side view of the first embodiment of a three-phase pulse motor, according to the present invention. In both figures, a variable reluctance type three-phase pulse motor 30 generally comprises a stator 31 and a rotor 32. The stator 31 comprises three portions 31a–31c. The stator portions 31a–31c respectively have a cylindrical space 33 in the center thereof, as shown in FIG. 4, and twelve lines of slits extending from the cylindrical space 33 to the outer periphery. The stator portions 31a–31c are respectively wound with stator windings 35a–35c.

The rotor 32 consists of three portions 32a–32c made of electromagnetic annealed steel. The rotor portions 32a–32c are respectively secured to a rotary shaft 36 and provided in the cylindrical space 33 respectively opposite to the stator portions 31a–31c. The rotor portions 32a–32c have respectively a plurality of teeth 37, radially projecting from the outer periphery of the cylindrical rotor body as shown in FIG. 4. The rotor 32 is rotated by the rotary magnetic field made by stator windings 35a–35c.

In keeping with an aspect of the invention, the hunting is prevented by providing a housing formed from a pair of end plates separated by a tubular housing and sealed to retain a fluid therein. Axially aligned bearings 39 in the end plates rotatably support a rotor 32 for enabling a step-by-step rotation responsive to a selective energization of coils 35. To preclude hunting, the space inside the housing is filled with any suitable packing fluid 38 having a characteristic which enables said stepping while precluding said hunting. For convenience of expression, this packing fluid is hereinafter referred to as "oil".

Oil 38 of preferred viscosity (of adequate coefficient of viscosity) for applying a viscous resistance fills a space, between the stator 31 and rotor 32, in the slits 34 and cylindrical space 33. The rotary shaft 36 is journally carried by bearings 39. The bearings 39 are provided on the outside with oil sealing packings 40 for preventing the leaking of oil 38. It is desired that the oil 38 may be silicone grease or oil, of excellent mechanical and temperature characteristics. The viscosity of the oil 38 is preferably adequate to damp the hunting phenomenon without changing the rising characteristic of the pulse motor.

Because the pulse motor 30 is constructed as described above, the teeth 37 of the rotor 32 receive an adequate viscous resistance from the oil 38, during its stepping rotation. Therefore, the rotor 32 receives the viscosity resistance from the oil 38 also when it stops the stepping rotation. Thus, the hunting during the stopping of its stepping rotation is damped efficiently, as required.

A characteristic of rising and stopping of the pulse motor 30 during the stepping rotation is shown by a full line II in FIG. 2B. As will be apparent from the figure, the pulse motor 30 performs the rising rotational torque during the stepping rotation as shown by a curve IIa and thereafter directly enters the almost stable stopping condition IIb. The stopping condition IIb has scarcely any hunting. As is clear from comparison of curves I and II, the pulse motor according to this invention does not produce hunting at the stopping of the stepping rotation.

In the pulse motor according to this invention, the gradient of the rising characteristic, at the start of stepping rotation, is appreciably easy due to the viscous resistance of the oil 38, in comparison with the characteristic of the conventional pulse motor which does not contain oil. The pulse motor of the invention, however, does not produce any overshoots and immediately enters into a stopping condition. Consequently, the period of its stopping is extremely long as compared with the conventional pulse motor.

Figure 6:
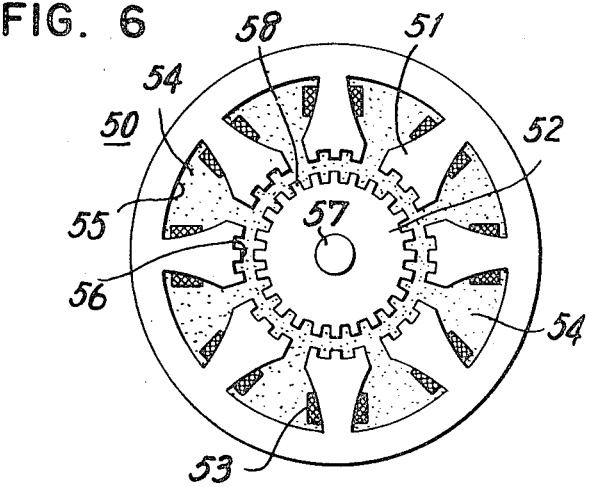
FIGS. 6 and 7 are respectively a vertically sectioned front view and a vertically sectioned side view of another embodiment of a digital rotation motor according to the invention.
Figure 7:
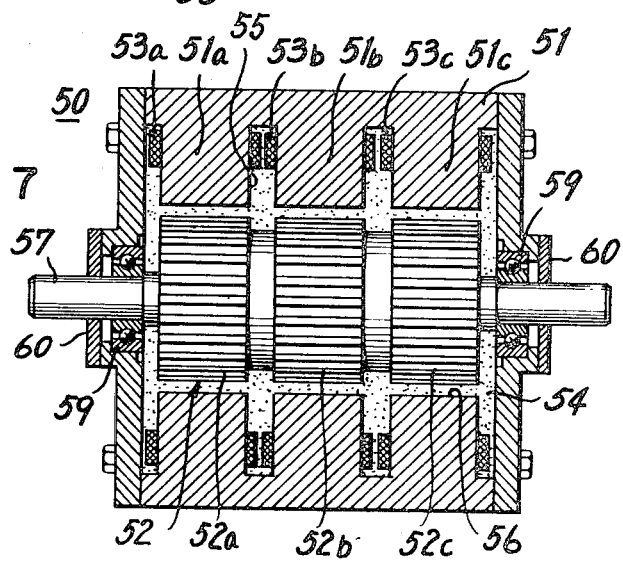

With reference to FIGS. 6 and 7, an embodiment of a pulse motor of the construction suitable for the actual production is described. A pulse motor 50 generally comprises a stator 51 and a rotor 52. The stator 51 consists of three stator portions 51a–51c respectively wound with stator windings 53a–53c (generally designated as 53). Slits 55 of sector shape are formed between the stator portions 51a–51c. Also, the stator 51 has a cylindrical space 56 in the center thereof.

The rotor 52 consists of three rotor portions 52a–52c which are incorporated into one body. The rotor portions 52a–52c are respectively fixed on a rotary shaft 57 respectively in positions which are opposite to stator portions 51a–51c in the above described cylindrical space 56. Rotor portions 52a–52c have respectively a plurality of teeth 58 radially projecting from the outer periphery of the cylindrical body. The rotor 52 is rotated by the rotary magnetic field made by stator windings 53a–53c. A rotary shaft 57 is journalled on bearings 59. Oil seals 60 is provided on the outside of the bearings 59.

Silicone oil 54, for viscous resistance, is filled in the slits 55 and between the stator 51 and the rotor 52 in the cylindrical space 56. In the embodiment, silicone oil KF–96H (prepared by Shinetsu Kagaku Co., Ltd., of Japan) is used as the silicone oil 54. The viscosity of this particular silicone oil is 10,000 cs (centi stokes).

The teeth 58 of the rotor 52 receive viscous resistance of the silicone oil 54 during its stepping rotation. As a result, the hunting is efficiently damped at the time of the stepping rotation of the rotor 52. Similarly as in the above embodiment, the hunting is scarcely produced in the stepping rotation.

Figure 8:
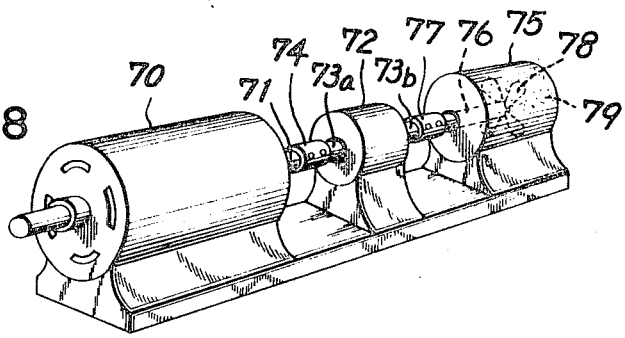
FIG. 8 is a perspective view of a further embodiment of a digital rotation motor according to the invention.

A further embodiment of the pulse motor according to the invention is shown in FIG. 8. In the preceding embodiments, the oil for viscous resistance is used to fill between the stator and the rotor. The motor unit contains a viscosity resistant oil. The present embodiment, however, has a construction so designed as to provide the oil for viscous resistance outside the motor and thereby impart the viscous resistance of oil to the rotary shaft from outside the motor.

A pulse motor 70 has a construction almost identical to the conventional type pulse motor. Rotary shaft 71 fixed to the rotor of the pulse motor 70 and a rotary shaft 73a projecting to one side of an electromagnetic clutch 72 are connected to each other by a sleeve joint 74. A rotary shaft 73b projecting to the other side of the electromagnetic clutch 72 and a rotary shaft 76 of a rotary viscosity loading part 75 are connected each other by a second sleeve joint 77. In the rotary viscosity loading part 75, the rotary shaft 76 has one or more fans 78 secured thereto. Oil 79, for viscous resistance, fills the rotary viscosity loading part 75. Silicone oil (the same as that used in the above embodiment) can be used for the oil 79. A resistant rotary body having teeth, instead of fans 78, may be used for the same objective.

At the start of the stepping rotation of the pulse motor, the electromagnetic clutch 72 is in an inoperative condition. Accordingly, the rotary shafts 73a and 73b of the electromagnetic clutch 72 are not connected to each other. Therefore, the pulse motor 70 and the rotary viscosity resistant part 75 are detached from each other. At the start of the stepping rotation of the pulse motor 70, the pulse motor is not restricted in its rising characteristic, but it can rise favorably with very steep and good characteristics. Here, it is preferable to design the construction of the pulse motor so that the inertia of the shaft 73a and brake mechanism in the electromagnetic clutch 72 may be sufficiently small compared with the permissible inertia of the pulse motor 70.

After the rotational rising of the pulse motor 70, the electromagnetic clutch 72 is operated and the rotary shaft 71 of the pulse motor 70 is connected to the rotary shaft 76 of the rotation viscosity resistant part 75. The rotary shaft 76 is rotated by rotation of the rotary shaft 71. At the instant, the shaft 76 receives the viscous resistance of the oil 79 acting on the fans 78. Thus, the rotary shaft 71 of the pulse motor 70 receives the viscous resistance of the oil 79 when it stops its rotation. The pulse motor stops immediately without producing hunting similarly as described in the previous embodiments.

The embodiments in the above description are mainly concerned with the application of the digital rotation motor of this invention to the rotary magnetic medium recording and reproducing apparatus. However, the present invention is not exclusively confined to these embodiments. The digital rotation motor of this invention can be applied also to various machine tools such as automatic boring machines, an intermittent magnetic head feeding device for an electronic computer and other devices which are used to intermittently transfer a movable article in a short period of time and immediately stop the article at a desired position without producing the hunting.

It may well be understood that the invention can make various variations and modifications in any form or manner if it does not depart from the spirit and scope of the invention.

What we claim is:

1. A magnetic recording and reproducing apparatus comprising a rotary magnetic medium, at least one magnetic head, and means comprising said head for recording concentric circular tracks of video signals on said medium, means comprising a digital rotation motor for successively moving said magnetic head in a stepping action, said digital rotation motor comprising a stator having at least one stator winding, a rotor disposed in opposition to said stator, there being a space between said rotor and said stator, means for applying an input pulse derived from said video signal to said winding for intermittently generating a rotary magnetic field, said rotor being digitally and intermittently rotated by said rotary magnetic field during a repetitive interval appearing in said video signal, and silicone oil filling said space between the rotor and the stator, said silicone oil having a viscosity which provides resistance to the rotation of said rotor and prevents hunting at the time of stopping the intermittent rotation of said rotor so that the magnetic head records all video signals between said intervals and does not trace a non-circular track on the rotary magnetic medium.

2. The apparatus of claim 1, wherein said rotor is of a shape having teeth on a cylindrical surface of the rotor body and has a construction for causing the viscous resistance of said oil to act on said teeth during rotation of said rotor.

3. The apparatus of claim 1, wherein the viscosity of said oil is approximately 10,000 centi-stokes.

4. The apparatus of claim 1, wherein said motor comprises a housing having a rotary shaft journaled therein, said motor further comprising oil sealing packings for preventing a leaking of said oil, said packings being provided over the journal bearings which journal said rotary shaft.

5. The apparatus of claim 1 which further comprises means including a rotary viscosity loading part containing said oil, fan means in said part containing said oil, loading rotary shaft means receiving viscous resistance from the oil contained in said loading part, and an electromagnetic clutch means for connecting the rotary shaft of said rotor and said loading rotary shaft, and means whereby said electromagnetic clutch detaches said rotary shaft from said loading rotary shaft at the starting time of rotation of said rotor and connects said rotary shaft and said loading rotary shaft after the starting of rotation of said rotor.

* * * * *